May 18, 1965 F. A. BEHNKE 3,184,717
ASSOCIATIVE MEMORY LOW TEMPERATURE FAST READ CIRCUIT
Filed April 17, 1962
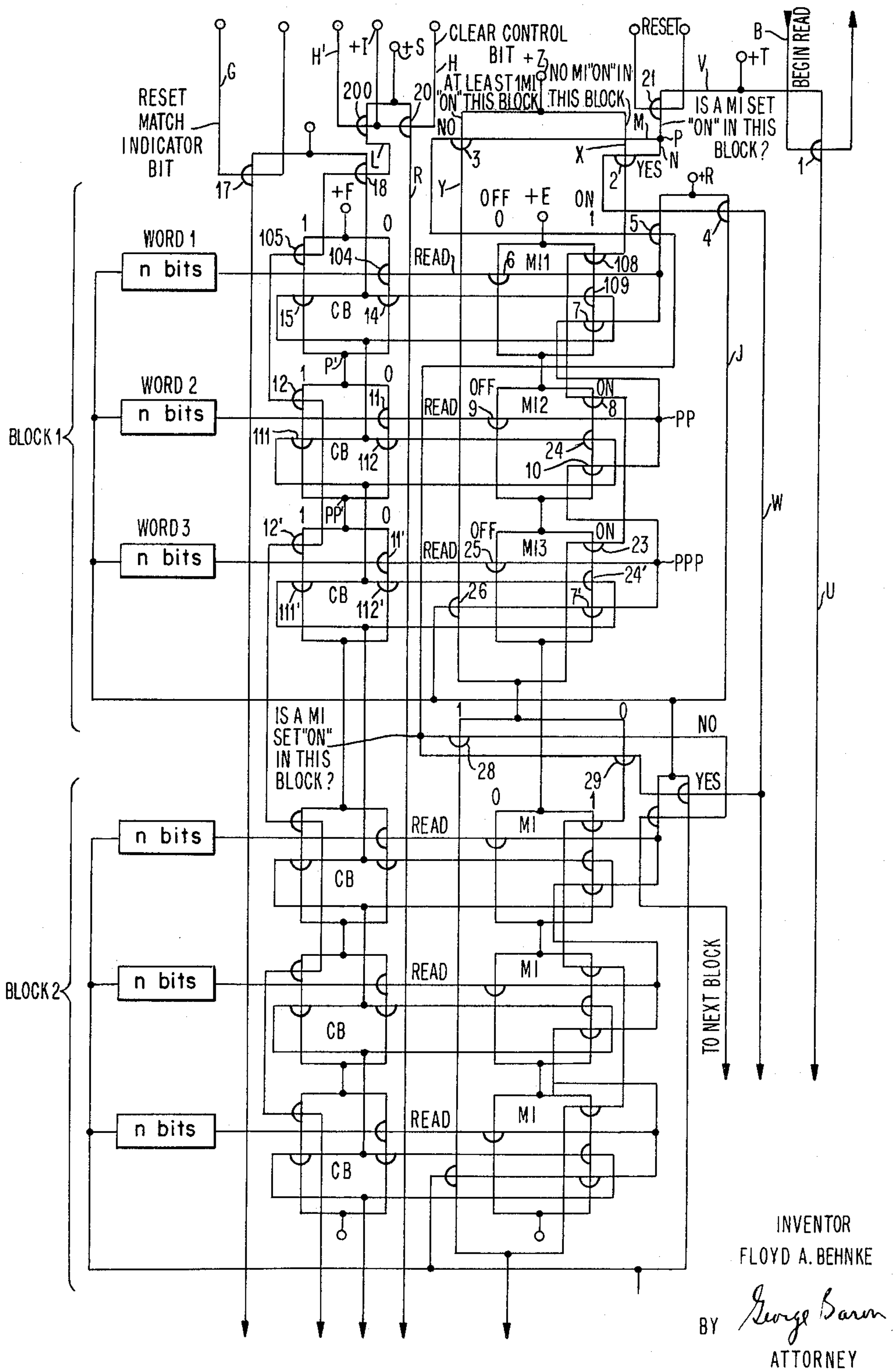
INVENTOR
FLOYD A. BEHNKE
BY George Baron
ATTORNEY United States Patent Office 3,184,717
Patented May 18, 1965

3,184,717

ASSOCIATIVE MEMORY LOW TEMPERATURE FAST READ CIRCUIT

Floyd A. Behnke, Ruby, N.Y., assignor to International Business Machines Corporation, New York, N.Y., a corporation of New York Filed Apr. 17, 1962, Ser. No. 188,152
5 Claims. (Cl. 340—173.1)

This invention relates to memory systems in general, and more particularly to the reading circuit of a fully associative memory.

In making searches in an associative memory system, a parallel simultaneous comparison is made of all the words in memory with a key word in an interrogation register. The words in memory are stored in a random fashion, and the comparing current compares each bit of the key word in the interrogation register with the corresponding bit positions of every word in memory. The comparing current is established on an equal line going into the high order position of each word register in memory. As long as the memory positions are equal to their corresponding positions in the interrogation register, the comparing current will not be diverted to the unequal line. At the end of each word in memory, an indicator bit, or match indicator bit as it is also called, is set to its "1" state by current on the equal line, indicating an equal word register. The indicator bit is set to its "0" state when its corresponding word register is unequal to the word in the interrogation register.

In a copending application filed on December 29, 1961 by Robert R. Seeber for "Associative Memory Ordered Retrieval" and having the Serial No. 163,233 and having the same assignee as the present applicant, there are disclosed match indicator bits for recording those word registers in memory which match the word in the interrogation register as well as means for reading out of memory such matched words. In such copending application, superconductive elements are employed for providing the match-indicating and read-out circuitry. In general, a crossed film cryotron is employed wherein the wide portion of the cryotron is the gate conductor and the thin line at right angles to the gate conductor carries control current. Current in a control line that is at right angles to a gate, renders the latter resistive. When a gate is in its superconductive state, such gate offers no resistance to current flow therethrough, provided such current flow remains below the critical current of the gate itself. Once supercurrent has switched from a first path to a second path because resistance has been placed in said first path, the supercurrent remains in the second path only even though the first path returns to its superconductive state.

One of the weak links of associative memory search units has been the read circuits. Present associative memory searching techniques require the simultaneous comparison of many words in memory with a key word in an interrogation register. This is a parallel recording of all those match indicator bits that represent a matched memory word. Such matched words must be read out consecutively. As a result, the overall read circuit is a large parallel network having low apparent resistance. Since the switching speed of a large parallel network varies as the inductance of the circuit and inversely as the resistance of the network, a low resistance will result in a high time constant. Since such high time constant slows down the speed of the read operation, the present invention increases the resistance of the switching networks used in reading in order to speed up such reading cycle.

The increased resistance is obtained by reducing the number of parallel paths in the effective network. The reduced number of parallel paths is accomplished by dividing the total number of match indicators into isolated groups or blocks. A circuit is provided which indicates whether or not a match indicator of the first block has been set to its ON state to represent a matched word register. The read circuit initially searches the blocks rather than all the individual match indicators, thereby reducing the number of parallel paths in the read circuit. When the first block is found in which a match indicator is in the ON state, an internal block read circuit is switched and searches the block for the first word to be read out of memory. After the matched word in such block is read out, its associated match indicator bit is switched to its OFF state. If another word register within the same block has been selected in that it is a matched word, the read operation is repeated until the block is free of selected words. The internal read circuit is turned off and the search for the next block containing matched words is continued, the procedure going from block to block until all selected words have been read out of memory.

Thus, an object of this invention is to obtain a first read circuit for an associative memory.

Another object is to obtain an improved read circuit employing cryogenic components.

Still another object is to obtain an improved read circuit for an associative memory employing a novel search unit.

The foregoing and other objects, features and advantages of the invention will be apparent from the following more particular description of preferred embodiments of the invention, as illustrated in the accompanying drawing.

The sole figure shows the preferred embodiment of the read circuit employing cryogenic elements.

The invention is illustrated as employing two blocks. Block 1 is shown as having three words therein and Block 2 also has three words within the block. It is understood that each word can be composed of any number of bits. Obviously, many more words can be contained in a block, and the number of blocks will be dependent upon the number of words in the entire memory. The compare circuits of the invention are not shown in that they are not necessary for a proper understanding of the invention.

Each block will consist of a match indicator circuit for each word in the block. Match indicator circuit number 1 (MI 1) comprises cryotrons 6, 7, 108 and 109, and match indicator 2 (MI 2) comprises cryotrons 8, 9, 10 and 24, and match indicator 3 (MI 3) comprises cryotrons 25, 23, 7' and 24'. Each block also contains control bits and control bit 1 comprises cryotrons 14, 15, 104 and 105, whereas control bit 2 comprises cryotrons 11, 12, 111 and 112, and control bit 3 has corresponding cryotrons, namely, 12', 11', 111' and 112'. All the cryotrons have a reset circuit that includes cryotrons 20, 200 and such cryotrons control the passage of current from source +S to either line L or R. A circuit for searching the state of the match indicator bits is controlled by cryotron 1 and cryotron 21. The searching proceeds on either line M or N, depending upon the states of the match indicator bits corresponding to the words in a given block.

Let us assume that the second and third match indicator bits of Block 1 have been set to their respective ON states. No other match indicators are ON in any other Block. We wish to read those selected words in memory, namely, words 2 and 3, which match the word in an interrogation register not shown.

At the beginning of a read cycle, the begin read line B is pulsed causing cryotron 1 to become resistive. Current from source +T, normally flowing in line U, now switches to line V, passing through gate cryotron 21. When such search current reaches point P, such current sees two possible paths, namely through cryotron 2 or cryotron 3.

If any match indicator in the first Block is in the ON state, current from source +Z will be diverted from line X and pass through line Y. Since cryotron 3 is now resistive, the current at point P passes through cryotron 2, through cryotron 4 and out to line W. Cryotron 4 is driven resistive, causing current from source +R to be diverted from the right-hand path to the left-hand path of the parallel path for current source +R. When current from source +R passes through gate 5, two possible paths exist for such current, one path being through cryotron 6 and the other through cryotron 7. However, since the assumption is that MI 1 is in the OFF state, current from source +E passes through cryotron 6, making the latter resistive. Consequently, the current from source +R passes through cryotron 7 reaching point PP. At point PP, two possible paths for the current are presented, namely, a path through cryotron 9 or cryotron 10. Since MI 2 is assumed to be in the ON state, cryotron 10 is resistive and the current at point PP passes through cryotron 9 and cryotron 11 of control bit 2. It is this latter current that reads out the contents of word 2, since the latter has been indicated as matching the word in the interrogation register.

When cryotron 11 has been driven resistive by the read current, current from source +F is diverted from the right-hand path of control bit 2 to the left-hand path of control bit 2. After readout of word 2 has occurred or sufficient time has been allowed for sensing of the word so read out can be accomplished by control circuitry not shown, reset match indicator current is initiated by pulsing line G. Current on line G causes cryotron 17 to become resistive, thus switching current from source +O from the left-hand path to the right-hand path. Such switched current flows through cryotron 18 and finds two possible paths through cryotrons 15 or 14. It is noted that control bit 1 has remained in the "0" state and cryotron 14 is therefore resistive. Thus, current from source +O is diverted through cryotron 15 existing at point P′. From point P′, two paths are possible, namely, through cryotron 111 or 112. It is noted, however, that control bit 2 has been set to its "1" state by the previous read current which has passed through cryotron 11. As a result, cryotron 111 is resistive, causing the current from +O source to pass through cryotron 112 and 24, making the latter resistive before reaching point PP′.

It is noted that the passage of current through cryotron 24 causes the match indicator bit 2, corresponding to word 2 which has just been read out, to switch to its OFF state. Since no other control bits have been set to 1, the current path emanating from source +O is through the left cryotrons of all remaining control bits. After the match indicator bit has been set to its OFF state, Clear Control Bit current is sent through line H. Such Clear Control current drives cryotron 20 resistive, switching current emanating from source +S from the right side to the left side, or from line R to line L. As can be seen, the left path L threads through every control bit in memory, attempting to switch all such control bits to their respective "0" states. Since only one, namely, control bit 2 has been set to its "1" state, it is the only one which is switched to its "0" state by current appearing on line L. All other control bits remain in their respective "0" states. It is noted that current on line L also drives cryotron 18 resistive which resets the Match Indicator Reset circuit by switching current from source +O from its right-hand path to its left-hand path.

As was described hereinabove, cryotron 9 was driven resistive and cryotron 10 became superconductive when match indicator bit 2 was switched to its OFF state. At this point, current appearing at point PP is diverted through cryotron 10 to appear at point PPP. Since match indicator bit 3 has been set to its ON state, readout of word 3 is initiated exactly as was explained hereinabove. After readout of word 3 has been completed and match indicator bit 3 has been reset to its OFF state, cryotron 25 goes resistive and the Block read current appearing at point PPP is switched through cryotrons 7′ and 26. Cryotron 26 goes resistive, causing current appearing on Y line to be transferred to the X line. Such transfer of current from source +Z to line X drives cryotron 2 resistive so that current appearing at point P goes through cryotrons 3 and 5. When cryotron 5 becomes resistive, current from source +R is transmitted through cryotron 4 onto line J. When current appears on line J, the search for matched words in Block 1 has been completed and the process for searching for matched words in Block 2 is identical to the steps use in searching for matched words in Block 1.

The read cycle for each successive block of words in the associative memory will comprise the following steps in the sequence indicated, namely, (1) pulsing the Begin Read line B to drive cryotron 1 resistive so as to divert Block Search current from neutral line U to line V; (2) current on line V searches out Block 1 for the presence of any matched words; (3) the presence of a matched word, as represented by a match indicator bit being in its ON state, will cause Block Read Current to be diverted from neutral line J into the memory portion of Block 1, so as to read out the first matched word, setting the corresponding control bit of the read-out word to its "1" state; in effect, one, and only one, control bit of a Block is set to its "1" state during readout even though there are a plurality of match indicator bits set to their respective ON states; (4) the match indicator bit corresponding to the first match word that was read out is reset to its OFF state; (5) Line H is pulsed to clear all control bits which, in effect, maintains all control bits in their respective "0" state but switches a single control bit from its "1" state to its "0" state; (6) a pulse is sent on line H′ to reset the Clear Control Bit line, such pulse making cryotron 200 resistive and diverting current from source +S onto neutral line R. Once a given Block indicates the absence of any match indicator bits in the ON state, all search currents are diverted into the next Block, namely Block 2, and all read cycles are effective in reading out only those matched words that are in Block 2. The searching continues until all subsequent Blocks having matched words are read out. When the last selected word of the last Block of words has been read out, the reset line through cryotron 21 is pulsed, driving the latter resistive so as to transfer search current from source +T to neutral line U.

The present invention, by searching for blocks of matched words in an associative memory instead of for individual matched words, avoids the use of a large parallel network during such search. This reduction in size of a parallel network increases the speed at which the matched words in an associative memory can be read out of memory.

What is claimed is:

1. An associative memory readout system comprising an array of word registers in a memory,
   a match indicator bit associated with each word register and settable to its ON state when its associated word register matches a key word in an interrogation register but maintained in its OFF state when a mismatch occurs,
   means for grouping said word registers and match indicator bits into individual blocks,
   and means for reading out the matched words of said memory in blocks,
   the presence of matching words in a first block of words inhibiting the readout of words in subsequent blocks.

2. An associative memory readout system comprising an array of word registers in a memory,
   a match indicator bit associated with each word register and settable to its ON state when its associated word register matches a key word in an interrogation register but maintained in its OFF state when a mismatch occurs, means for grouping said word registers and match indicator bits into consecutively arranged individual blocks, means for searching for and indicating the presence of the first said consecutively arranged block containing a matching word requiring readout, and means for inhibiting said searching means from indicating the presence of matching words in all blocks subsequent to a block containing matching words until the latter words are read out.

3. An associative memory readout system comprising an array of word registers in a memory, a match indicator bit associated with each word register and settable to its ON state when its associated word register matches a key word in an interrogation register but is maintained in its OFF state when a mismatch occurs, a control bit associated with each word register and its corresponding match indicator bit, means for grouping said word registers and match indicator bits into individual blocks, means for reading out the matched words of said memory in blocks, means for inhibiting the readout of matching words in all blocks subsequent to a block containing matching words until the latter words are read out, and means for setting a control bit to its ON state to indicate the first matched word readout.

4. The invention as defined in claim 3 including means for setting a match indicator bit to its OFF state in response to the readout of that word corresponding to such match indicator bit.

5. The invention as defined in claim 3 wherein the readout system comprises cryotrons and superconducting circuitry.

References Cited by the Examiner

UNITED STATES PATENTS 3,021,440 2/62 Anderson ------------ 340—173.1

OTHER REFERENCES

Kiseda et al.: A Magnetic Associative Memory, IBM Journal, April 1961, pp. 106–121.

IRVING L. SRAGOW, *Primary Examiner.*